UNITED STATES PATENT OFFICE.

EDGAR ROUSE SUTCLIFFE, OF LEIGH, ENGLAND.

TILES, ROOF-SHEETS, AND THE LIKE.

1,204,086.

Specification of Letters Patent.

Patented Nov. 7, 1916.

No Drawing.

Application filed April 4, 1916. Serial No. 88,920.

*To all whom it may concern:*

Be it known that I, EDGAR ROUSE SUTCLIFFE, a subject of the King of Great Britain and Ireland, residing at Leigh, Lancashire, England, have invented certain new and useful Improvements in Tiles, Roof-Sheets, and the like, of which the following is a specification.

This invention relates to tiles, and it has for its object to provide goods that are weather resisting and durable.

It is well known to produce artificial stone and like material from such substances as sand and lime which are formed into a pasty mass and molded under pressure and afterward subjected to treatment with steam for hardening purposes. It has also been proposed to form slabs from molded masses of clay or other like substance mixed with asbestos and a binding material such as sodium silicate, by pressing them while moist between metal plates in association with heating chambers through which steam is passed.

It has also been proposed to produce slabs or tiles from mixtures of sand and lime, and sand, lime and asbestos but hitherto it has not been possible to produce tiles of a toughness and weather resisting quality comparable to natural slates or asbestos cement tiles in the use of sand and lime instead of cement, and sand, lime and asbestos mixtures have thus not been employed commercially for the manufacture of tiles.

According to the invention tiles are provided as slabs made of lime and fine sand and asbestos fiber, such slabs being weather resisting, durable and tough.

The slabs according to the invention are conveniently produced by the process hereinafter described.

In carrying out the process before referred to I mix sand and lime in the proportion of 4 to 5 of sand to 1 of lime and I produce a liquid slip therewith. I mix with this slip, asbestos fiber beaten up previously into a pulp with water or otherwise, the quantity used being, for example, 15 per cent. reckoned on the finished weight. I then press this liquid mixture in the molds of a suitable press. The mold is provided with a sacking or other suitable filter sheet and either with or without a superposed paper sheet. The pressing operation is carried out with the purpose of expressing the water and leaving a slab or sheet fairly free from moisture. The pressed slabs or sheets are then placed one upon the other while still on their filter sheet, a sheet being interposed of any suitable substance such as sheet iron or of previously hardened asbestos; and on a sufficient number of such sheets or slabs being collected I press the pile and a further quantity of moisture may thereby be expressed from the slabs or sheets. The slabs or sheets are then separated from the filter sheets and again piled one upon the other with sheets interposed of sheet iron or other suitable material and again pressed so that thus the slabs or sheets are provided with smooth faces. I then clamp a number of such sheets or slabs together so as to retain them under pressure and I place the sheets within a chamber where they may be subjected to the action of steam at a high or low pressure, so that they may be thus indurated in a manner similar to that usually employed in the production of lime and sand bricks. I advantageously use sand which is the refuse of glass polishing. This material is eminently suited for the purpose of the invention by reason of its fine condition, but sand from any other suitable source may be used which may be specially prepared or ground for the purpose together with the lime. This operation may be carried out wet. I may, for example, use the silicious waste from gold or other mines and I may even use blast furnace or other slags, or material such as pozzuolanas found in Italy and elsewhere.

I claim:

A new article of manufacture being a tile made of lime, fine sand and asbestos deprived of superfluous moisture, indurated and rendered tough.

EDGAR ROUSE SUTCLIFFE.

Witnesses:
 WILLIAM EDWARD EVANS,
 SAMUEL GREENBERG.